United States Patent [19]

Knopf

[11] 3,999,387
[45] Dec. 28, 1976

[54] CLOSED LOOP CONTROL SYSTEM FOR HYDROSTATIC TRANSMISSION

[76] Inventor: Frank A. Knopf, 3326 W. Verona Court, Milwaukee, Wis. 53215

[22] Filed: Sept. 25, 1975
(Under Rule 47)

[21] Appl. No.: 616,864

[52] U.S. Cl. .................. 60/444; 60/451; 60/465; 60/488
[51] Int. Cl.² .................. F16H 39/46
[58] Field of Search ........... 60/443, 444, 451, 464, 60/465, 487, 488, 494

[56] References Cited
UNITED STATES PATENTS

| | | | |
|---|---|---|---|
| 2,932,948 | 4/1960 | Neff et al. | 60/444 |
| 3,788,773 | 1/1974 | Van der Kolk | 60/444 X |
| 3,788,774 | 1/1974 | Roesslein | 60/444 X |
| 3,823,558 | 7/1974 | Tittman et al. | 60/488 X |
| 3,901,031 | 8/1975 | Knapp et al. | 60/444 X |

Primary Examiner—Edgar W. Geoghegan
Attorney, Agent, or Firm—James E. Nilles

[57] ABSTRACT

A hydrostatic transmission for accelerating, driving and braking a high inertia load, such as the swing mechanism of a power shovel or crane, includes an engine-driven swashplate-type variable displacement constant speed reversible main hydraulic pump coupled in a closed loop circuit to a swashplate-type fixed displacement variable speed reversible hydraulic motor. A pair of control lever operated pilot pressure modulated pump displacement control valves selectively direct control fluid from an engine-driven fixed displacement constant speed charge pump to the stroking pistons of the servo control cylinders on the main pump to thereby control motor direction and speed. The charge pump also supplies replenishing fluid to the main pump/motor circuit through replenishing check valves. A network of three flow control valves is connected across the main pump/motor circuit and to the charge pump outlet to measure the fluid pressure drop across the motor and thus provide a torque feedback signal to modulate the control valves and thereby maintain maximum motor torque for the control lever position selected. A balancing signal is also transmitted from the charge pump to further modulate the control valves and thereby render them insensitive to variations in charge pump pressure appearing in the torque feedback signal.

18 Claims, 4 Drawing Figures

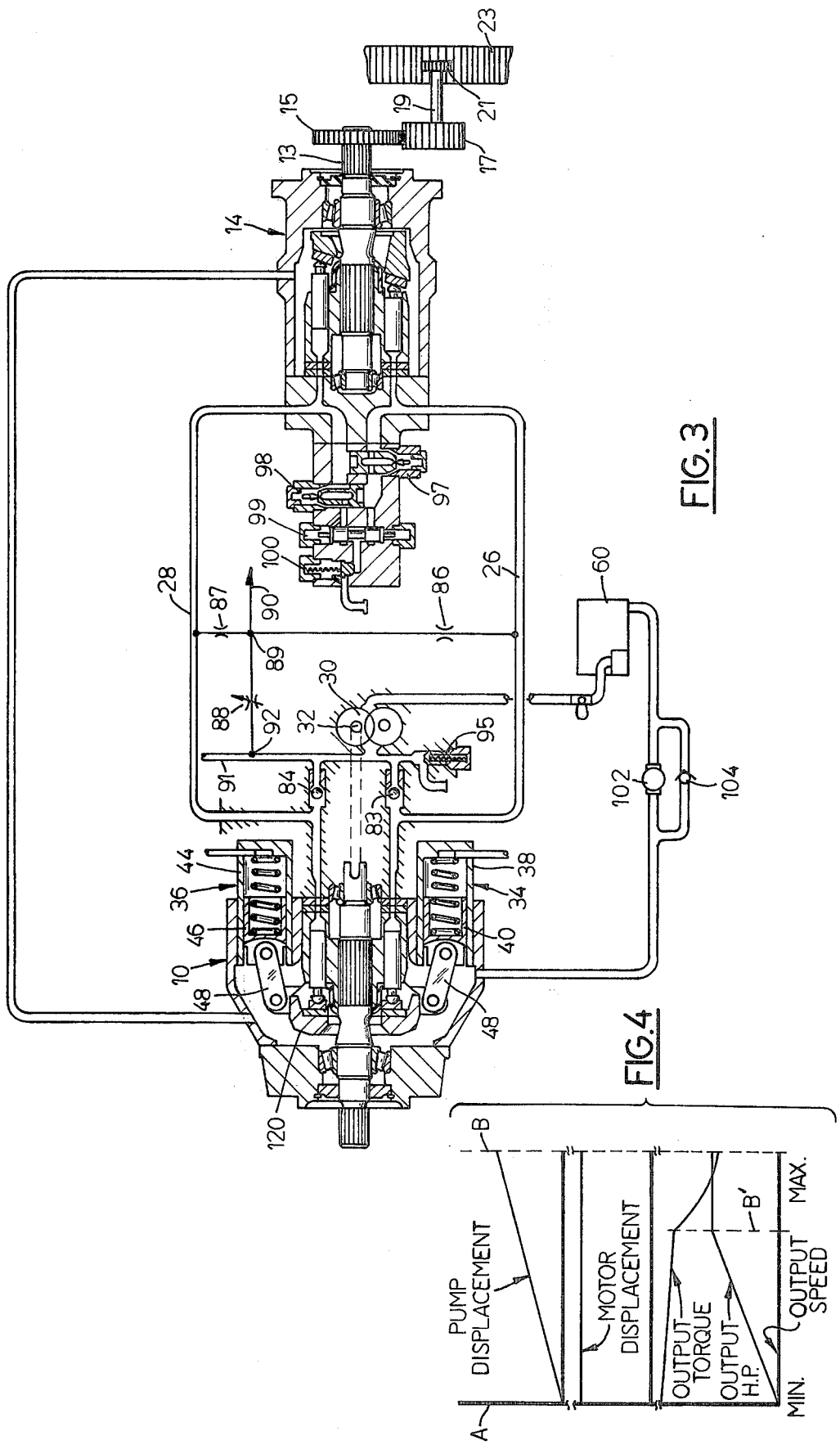

CLOSED LOOP CONTROL SYSTEM FOR HYDROSTATIC TRANSMISSION

BACKGROUND OF THE INVENTION

1. Field of Use

This invention relates generally to hydrostatic transmissions for the swing mechanisms of machinery, such as hoes, cranes, shovels or the like, wherein the transmission comprises a main hydraulic pump coupled in a closed loop circuit to a hydraulic motor. More specifically, it relates to control systems for such transmissions wherein lever operated control valves selectively direct control fluid from a charge pump to the main pump stroking pistons to control motor speed and direction; wherein torque feedback signals from the circuit modulate the control valves to thereby control motor torque; and wherein balancing signals from the charge pump balance the torque feedback signals to render the control valves insensitive to variations in charge pump pressure.

2. Description of the Prior Art

Some hydraulic power transmission systems for accelerating, driving and braking high inertia loads, such as the swing mechanism of a power shovel or crane, employ a hydrostatic transmission comprising a hydraulic pump and a hydraulic motor. In such systems the load is best controlled by regulating motor torque rather than motor speed. U.S. Pat. No. 3,747,350 discloses an open loop power transmission system which uses a directional valve disposed between a fixed displacement pump and a unidirectional motor and a pilot operated relief valve for controlling torque, as well as other motor functions. The present invention is an improvement over a system disclosed in Bulletin 9565 Rev. D dated June, 1972 entitled "Heavy Duty Transmissions" of Sundstrand Hydro-Transmission, Ames, Iowa 50010.

It is an object of the present invention to provide a closed loop torque control system which avoids the use of directional control valves between the pump and the motor, which avoids dependence on energy-wasting relief or dump valves for system control, which is insensitive to variations in charge pump pressure and offers other advantages.

SUMMARY OF THE INVENTION

A hydrostatic transmission for accelerating, driving and braking a high inertia load, such as the swing mechanism of a power shovel, hoe or crane and material handling machinery, includes an engine-driven swashplate-type variable displacement constant speed reversible main hydraulic pump coupled in a closed loop circuit to a swashplate-type fixed displacement variable speed reversible hydraulic motor. The pump includes conventional servo control cylinders including stroking pistons. A pair of lever operated pilot pressure modulated pump displacement control valves selectively direct control fluid from an engine-driven fixed displacement constant speed charge pump to the stroking pistons to thereby control motor direction and speed. The charge pump also supplies replenishing fluid to the main pump/motor circuit through replenishing check valves. A network of three flow control valves is connected across the main pump/motor circuit and to the charge pump outlet to measure the fluid pressure drop across the motor and thus provide a torque feedback signal to modulate the control valves and thereby maintain a maximum motor torque for each control lever position selected. A balancing signal is also transmitted from the charge pump to further modulate the control valves and thereby render them insensitive to variations in charge pump pressure appearing in the torque feedback signal.

More specifically, each control valve, which is operated by a manual control lever acting through a pneumatic amplifier takes the form of an infinite position three-way valve and includes a valve spool selectively movable to a desired position. Each control valve also comprises a fluid inlet port connected to the charge pump, an outlet port connected to a respective stroking piston, and a dump port connected to sump. Each control valve also comprises a torque feedback signal port for receiving pilot fluid which modulates or moves the valve spool in one direction and a balancing signal port for receiving pilot fluid which modulates or moves the valve spool in the opposite direction. The valve spool is normally biased to connect the fluid inlet port to sump and is selectively movable in response to control lever movement to connect the fluid inlet port to the fluid outlet port to direct fluid from the charge pump to a respective stroking piston to cause pump swashplate movement and thereby effect motor control. A fluid supply line between the charge pump outlet and the control valve inlet ports includes a throttling orifice to limit the response speed of the stroking pistons.

A torque control network or circuit is provided for sensing motor torque and for providing a torque feedback signal to modulate whichever control valve is in operation (open) and thereby maintain a maximum motor torque for any given control lever position. The torque control network includes a pair of flow control orifices (or valves) connected in series across the closed loop circuit and a third (fixed or adjustable flow control orifice (or valve) connected between the charge pump outlet and a point between the said pair of flow control orifices. The said point is connected by a pilot fluid line to the torque feedback signal ports of the control valves to modulate the movement of the control valve spools and thereby maintain a maximum motor torque for a selected control lever position.

A balancing circuit is provided for delivering a balancing signal to modulate whichever control valve is in operation (open) and to render it insensitive to any variations in charge pump pressure which is being transmitted in the torque feedback signal. The balancing circuit comprises a pilot fluid line connected between the charge pump outlet and the balancing signal ports of the control valves.

In operation, operation of the control lever from neutral results in actuation (opening) of one of the control valves and allows fluid to flow to its associated servo control cylinder so as to move the pump swashplate from neutral, thereby placing the main pump in a pumping mode of operation for a desired motor speed and direction. The resulting fluid pressure produced in the closed loop circuit between the main pump and motor is conditioned by the flow control orifice network in the torque control circuit to produce a torque feedback signal to one end of the spool of the actuated control valve which acts to inhibit the spool motion induced by manual operation. The resulting effect is that fluid pressure in the pump output line to the motor varies in proportion with motion of the control handle, as modulated by the torque feedback signal, and maintains motor torque at a maximum level for whatever control lever position is selected. The balancing signal, applied to the other side of the spool of the actuated control valve, reflects changes in charge pump pressure and functions to compensate for valve spool motion which would otherwise result from variations in charge pump output pressure reflected in the feedback signal. Such variations result from operation of the plurality of relief valves that are utilized in the charge pump circuit. System components, such as the flow control orifices, are designed or selected to obtain gain and damping characteristics suitable for proper closed-loop operation.

In addition to the foregoing features and advantages of the present invention, another important feature is that the transmission system, when applied in the drive system for the swing mechanism of machinery such as a power shovel, hoe or crane, allows for free swing of the upper section of the machine after the control lever is returned to neutral. That is to say, the main pump does not effect an immediate braking action on the swing mechanism, but allows fluid to flow for a short period of time to allow the upper section to continue to swing. This is possible because the torque control network or circuit senses that there is fluid back pressure on one side of the closed loop motor/pump circuit and keeps the pump swashplate at some predetermined non-neutral position. Thus, the motor acts like a pump, and the main pump acts like a motor and tends to stay on stroke. The net effect is to provide controlled torque deceleration of the swing mechanism and differs from conventional systems wherein pressure relief valves would open under the back pressure to dump oil (and thus waste energy) at this point in a typical machine operation.

DRAWINGS

FIG. 3 is a diagram similar to that of FIG. 2 but showing cross-section views of the hydraulic main pump and motor; and FIG. 4 is a graph depicting the general performance characteristics of the transmission shown in FIGS. 2 and 3.

DESCRIPTION OF A PREFERRED EMBODIMENT

Figure 1:
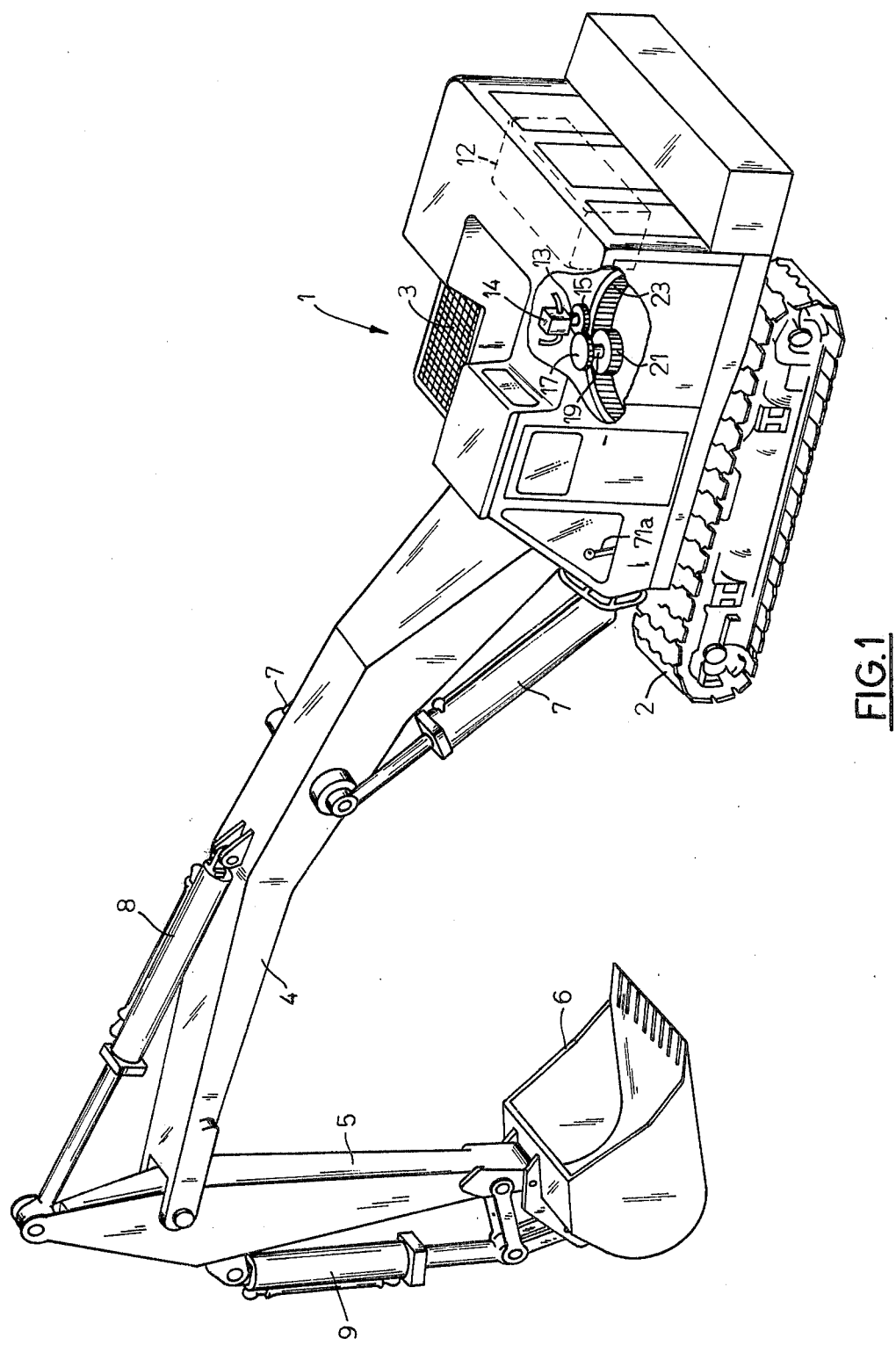
FIG. 1 is a perspective view of an earth moving machine, such as a hoe, employing a hydrostatic transmission in accordance with the invention for accelerating, driving and braking the swing mechanism thereof.

Referring to FIG. 1 of the drawing, there is shown an earthmoving machine, such as a hydraulic hoe 1, comprising a lower section or crawler assembly 2 on which an upper section 3 is mounted for rotating (swinging) in opposite directions about a vertical axis by means of a fixed displacement variable speed reversible hydraulic motor 14. A hoe boom 4 is mounted for pivotal movement about a horizontal axis on upper section 3 and has a hoe dipper arm 5 mounted for pivotal movement about a horizontal axis at the end thereof. A dipper 6 is mounted for pivotal movement about a horizontal axis at the end of dipper arm 5. Hoe boom 4 is raised and lowered by means of hydraulic hoist cylinders 7. Dipper arm 5 is pivotally moved by means of a dig cylinder 8. Dipper 6 is pivotally moved by means of a hydraulic dipper cylinder 9.

As FIGS. 1 and 3 show, motor 14 which is rigidly mounted on upper section 3 has a rotatable output shaft 13 on which a gear 15 is affixed. Gear 15 is in constant mesh with a gear 17 affixed on the upper end of a vertically disposed rotatable swing shaft 19. A pinion gear 21 on the lower end of swing shaft 19 is in constant mesh with a large ring gear 23 rigidly secured to the lower section 2 of the hoe 1. Thus, as the shaft 13 of motor 14 rotates in one direction or the other, it effects corresponding rotation of upper section 3 of the hoe 1.

Figure 2:
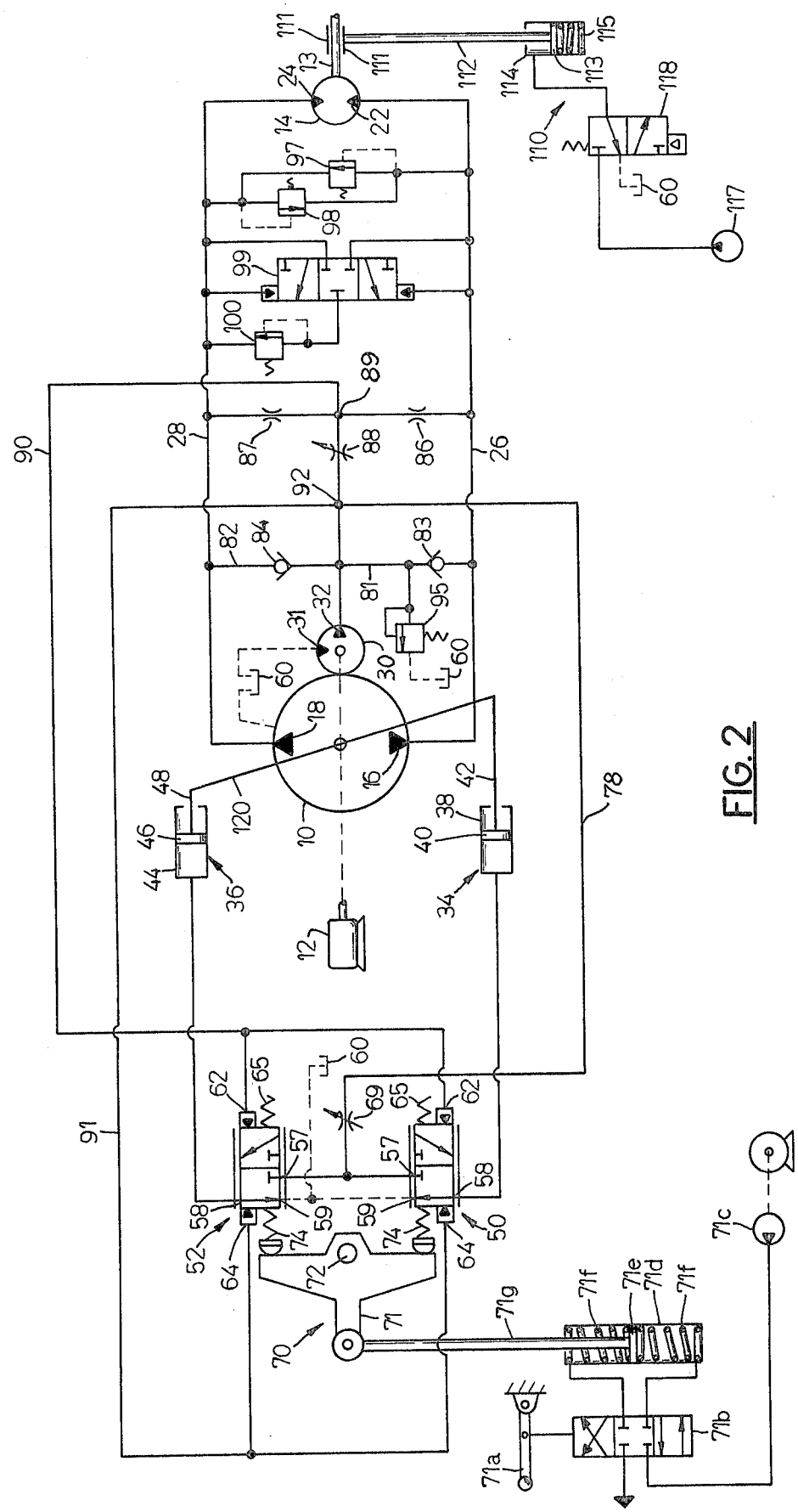
FIG. 2 is a schematic diagram of a hydrostatic transmission in accordance with the invention.

As FIGS. 2 and 3 show, motor 14 is part of a hydrostatic transmission for accelerating, driving and braking the swing mechanism (upper section 3) of hoe 1, which is a high inertia load. The transmission also includes a variable displacement constant speed unidirectional main pump 10 driven by engine 12 and coupled in a closed loop to motor 14 to provide a controlled torque drive. As FIG. 3 shows, pump 10 is of the axial piston adjustable swashplate type and, as herein explained, control of the pump 10 effects control of motor 14 and all swing movements. The hydrostatic transmission offers infinite control of swing speed and direction. The dynamic braking capabilities inherent with the closed circuit hydrostatic transmission provide normal braking requirements. This braking capability is dependent upon the transmission size, including relief valve settings, as well as the retarding characteristics of the prime mover. Stopping time is related to the momentum of the mechanism. A Sundstrand 21 Series Pump and a Sundstrand 23 Series Motor are suitable for use in accordance with the invention and both are described in Bulletin 9565 Revision D, June, 1972, available from Sundstrand Hydro-Transmission, Ames, Iowa 50010.

Control means, including a manually operable control lever 71a, shown in FIGS. 1 and 2, are provided to selectively control the direction and speed of motor 14 and to maintain motor torque at a maximum value for the particular lever position selected. The machine's operator has complete control of the swing movements of the system by means of one control lever 71a, shown in FIGS. 1 and 2, for starting, stopping, forward motion, or reverse motion. When the operator moves the control lever 71a, the swashplate 120 in the pump 10 is tilted from neutral. The position of the control lever 71a will determine the maximum pressure on the pump output side and move the swashplate 120 and, therefore, the volume of oil displaced by the pump 10 to maintain selected pressure and torque. The control lever 71a is stepless, therefore swing speed of the upper section 3 in either direction is infinitely variable from zero to maximum.

The control lever 71a can be moved rapidly to some predetermined position with the servo follow-up system moving the swashplate 120 of the pump 10 to provide this predetermined torque. The use of a servo system allows a minimum force to move the control handle 71a.

The main pump 10, which is driven at constant speed by engine 12 includes two ports 16 and 18 and a selectively movable swashplate 120 for determining which pump port is to be pressurized and the extent of such pressurization. Main pump 10 is capable of supplying fluid at some maximum pressure at either of its ports 16 or 18, depending on which port is pressurized. The horsepower at any given working pressure is directly proportional to pump flow. The torque of motor 14 depends on its displacement and the working pressure established. The motor 14 has two ports 22 and 24 which are connected to the main pump ports 16 and 18, respectively, by a pair of main fluid lines 26 and 28, respectively. It is understood, for example, that fluid enters motor 14 at either port 22 or 24 at a certain pressure and exits therefrom at some lower pressure. Assume for purposes of illustration that when motor port 22 is pressurized, motor 14 rotates in one (forward) direction, and when motor port 24 is pressurized motor 14 rotates in the opposite (reverse) direction.

A source of pressurized fluid is provided in the form of a unidirectional fixed displacement constant speed charge pump 30 having a fluid inlet port 31 connected by a fluid line to reservoir 60 and a fluid outlet 32. The charge pump 30, which is driven by engine 12, supplies make-up fluid to the circuit for the main pump 10 and motor 14 and also supplies control fluid to the control system hereinafter described. In an actual embodiment, pump 30 also provides oil for cooling purposes and for internal leakage makeup.

Control of speed and direction is accomplished by the movement of the control lever 71a from the neutral position in which it is shown. The pump swashplate 120 is spring loaded to neutral position to insure positive neutral. The swashplate 120 is provided with two opposed single acting servo or stroking cylinders 34 and 36 to move the swashplate 120 and thus vary pump displacement. Pressurizing one of the cylinders 34 or 36 while exhausting the other will move the swashplate 120 from its neutral position. To obtain the reverse direction from neutral, the opposite cylinder is pressurized and the other is exhausted. Oil is directed to the desired servo cylinder 34 or 36 by the appropriate control valve 50 or 52, respectively, which is actuated by a signal from the operator by means of the control lever 71a. Stroking cylinder 34 comprises a cylinder 38, a piston 40 and a piston rod 42 which is connected between the piston and one side of swashplate 120 of pump 10. Stroking cylinder 36 comprises a cylinder 44, a piston 46 and a piston rod 48 which is connected between the piston and the other side of swashplate 120 of pump 10. When fluid is supplied to stroking cylinder 34, port 16 of pump 10 is pressurized. When fluid is supplied to stroking cylinder 36, port 18 of pump 10 is pressurized.

A pair of selectively operable main control valves 50 and 52 are provided for directing operating fluid from the charge pump 30 to the stroking cylinders 34 and 36, respectively, to establish the direction of motor rotation and maximum torque. Each main control valve 50, 52 takes the form of a manually operable pilot fluid modulated infinite position three-way valve. Each main control valve 50, 52 includes a movable control spool therein (not shown), a fluid inlet port 57 connected to the charge pump 30, a fluid outlet port 58 connected to a respective stroking cylinder 34 or 36, and a dump port 59 connected to sump 60. Each control valve 50, 52 also has a torque feedback signal port 62 and a balancing signal port 64. The control valve spools of the main control valves 50 and 52 are normally biased by springs 65 to block the fluid inlet ports 57 from sump 60 and to connect ports 58 to sump 60 and is manually movable to connect the fluid inlet ports 57 to the fluid outlet port 58 to direct operating fluid from the charge pump 30 to a respective stroking cylinder 34 or 36. Each main control valve spool of the main control valves 50 and 52 is understood to be movable in response to pilot fluid pressure at its torque feedback signal port 62 and at its balancing signal port 64, as hereinafter explained.

A control valve operating assembly 70 is provided for actuating the main control valves 50 and 52 in response to operation of control lever 71a to effect operation of motor 14 in a desired direction at a desired torque. The assembly 70 comprises a lever 71 which is pivotally movable in opposite directions about a point 72 to actuate the main control valves 50 and 52 which, in turn, actuate the stroking cylinders 34 and 36, respectively. As FIG. 2 shows, the manual operating or control lever 71a, which is located in the machine cab, operates a three-position infinitely adjustable (neutral, swing-right, swing-left) pneumatically operated valve 71b which controls pressure of pneumatic fluid from a motor-driven pneumatic pump 71c to a pneumatic actuator or cylinder 71d. The cylinder 71d comprises a piston 71e which is centered by a pair of oppositely acting biasing springs 71f. Piston 71e is connected to a piston rod 71g which, in turn, is connected to operate lever 71. Lever 71 is connected to the valve spools of the control valves 50 and 52 through operating springs 74 and 76 which allow for spool movement in response to pilot pressure even though the lever is depressed. The shiftable valve spools of the main control valves 50 and 52 are movable in response to compression of the springs 74 in response to pivoting of lever 71 to effect communication between inlet ports 57 and outlet ports 58. The degree of movement of control lever 71a initially determines the extent of movement of the spools of the main control valves 50 and 52. The spools of the main control valves 50 and 52 also respond to pilot pressure applied at the pilot fluid signal ports 62 and 64. When a feedback signal is supplied to the port 62 the valve spools of the main control valves 50 and 52 move in response thereto. Furthermore, these valve spools are also movable in the opposite direction in response to a balancing signal applied at its balancing port 64.

A fluid supply line 78 is provided for supplying control fluid from the charge pump outlet 32 to the inlet ports 57 of the main control valves 50, 52 and the supply line 78 includes an adjustable flow control valve 69 or throttling orifice 69 to limit the maximum speed of response of the stroking pistons. The outlet port 32 of charge pump 30 is connected to main fluid lines 26 and 28 by means of fluid lines 81 and 82, respectively, which have replenishing check valves 83 and 84, respectively, therein. The check valves 83 and 84 are arranged so as to permit replenishing fluid to flow from charge pump 30 to whichever of the ports 16 or 18 of main pump 10 is serving at any given time during pump operation as the pump inlet (low pressure) port. When either of the check valves 83 or 84 is open and serving to permit passage of replenishing fluid to pump 10, then the other check valve is maintained closed by the high pressure of the fluid in the fluid line 26 or 28 connected between main pump 10 and motor 14.

The control means further comprise a torque control circuit for sensing motor torque and for providing a torque feedback signal to modulate the main control valves 50 and 52 and thereby maintain torque output of motor 14 constant. The torque control circuit comprises a network including a pair of non-adjustable flow control valves or orifices 86 and 87 which are connected in series between the main lines 26 and 28 across the motor ports 22 and 24 and a third flow control valve or orifice 88 which is connected between the charge pump outlet 32 and a point 89 between the said pair of flow control valves 86 and 87. Orifice 88 may be fixed or adjustable so that it can be set for a desired rate of flow during installation of the system. The said point 89 of the circuit is also connected by a fluid line 90 to the torque feedback signal ports to modulate the movement of the valve spools of the main control valves 50 and 52.

The control means also comprise a balancing circuit for providing a balancing signal to modulate the main control valves 50 and 52 and render them insensitive to variations in charge pump pressure transmitted to the main control valves in the torque feedback signal through line 90. The balancing circuit comprises a fluid line 91 connected at a point 92 between the charge pump outlet 32 and orifice 88 and the balancing signal ports 64 of the main control valves 50 and 52.

Oil flows in the main circuit comprising pump 10, motor 14 and main lines 26 and 28 in a continuous closed loop. The quantity of oil flow is determined by the speed at which pump 10 is driven by engine 12 and by displacement of main pump 10 while direction of flow is determined by the angle from neutral of its swashplate 120. A manifold valve assembly, connected across the main lines 26 and 28, includes valve elements essential to provide for proper operation of the transmission. The manifold valve assembly contains two pilot-operated adjustable high pressure relief valves 97 and 98 which serve to prevent sustained abnormal pressure surges in either of the two main hydraulic lines 26 and 28 by dumping oil from the high pressure line to the low pressure line during abnormally rapid acceleration, abrupt braking, and sudden application of load. Also provided in the manifold valve assembly is a shuttle valve 99 and a charge pressure relief valve 100. The shuttle valve 99 functions to establish a circuit between the main line (26 or 28) that is at low pressure, and the charge pressure relief valve 100 to provide a means for controlling the charge pressure level and also as a means for removing the excess cooling oil added to the circuit by the charge pump 30. The shuttle valve 99 is spring centered to a closed position so that during the transition of the reversing of pressures in the main lines 26 and 28, none of the high pressure oil is lost from the circuit. A pressure relief valve 95 is connected to the outlet 32 of charge pump 30.

Excess cooling oil from the charge pressure relief valve 100 enters the motor case, then flows through case drain lines to the pump case. In this way the charge pump cooling oil is circulated through each of the hydraulic elements in series to aid in cooling. The cooling oil then exits from the pump case, passes through a heat exchanger 102 and is returned to the reservoir 60. A by-pass valve 104 is provided to prevent high case back pressure at the heat exchanger 102 due to cold oil or a restricted cooler. During periods of operation when the main pump 10 is in neutral, the shuttle valve 99 will be closed and the excess from the charge pump 30 is directed to the cooling circuit by the pressure relief valve 95 in the charge pump circuit. When operating at this condition, cooling oil flow is not admitted to motor 14 because it is at rest.

As FIG. 2 shows, it is preferable to provide a conventional spring-applied pneumatically or hydraulically released brake 110 for the shaft 13 of motor 14 to positively prevent rotation of upper section 3 of hoe 1 when motor 14 is not in operation. Such a brake 110 is shown as comprising brake shoes 111 for releasable engagement with shaft 13 and a piston rod 112 for operating the brake shoes. The piston rod 112 is connected to the piston 113 of a brake release cylinder 114, which piston is biased to brake-applied position by a compression spring 115. Piston 113 is movable against the bias of spring 115 by the application of air or hydraulic fluid to one end of cylinder 114 from a fluid source 117 through a conventional pilot operated two-position (apply-release) brake control valve 118. It is to be understood that control valve 118 is connected to manual control lever 71a by conventional means (not shown) so that valve 118 assumes the brake-applied position when the control lever 71a is in neutral and assumes the brake-release position when the control lever 71a is in any position other than neutral.

Referring to the graph in FIG. 4, there are shown curves which depict the general performance of a circuit comprising the variable displacement pump 10 and the fixed displacement motor 14. Assuming a constant input speed from engine 12, it is clear that maximum efficiency occurs near top input speed; that output speed is controlled by pump displacement (and input speed); that for optimum hydraulic operation the pump size (displacement) should be equal to motor size (displacement); and that the system provides infinite control.

Regarding line A on the graph, when the displacement of pump 10 is minimum (zero) there is no output from the transmission. As the pump 10 is put in stroke, maximum starting torque will be available, since the motor 14 is always in maximum displacement.

Regarding line B' on the graph, the torque has remained basically constant, while the output horsepower has increased from minimum to maximum, assuming constant working pressure.

Regarding line B on the graph, when the pump displacement is at maximum, the motor displacement has remained constant since it is fixed. The motor 14 is now at full speed, since the pump displacement is at maximum. The torque is reduced because horsepower was constant from line B' to line B. Thus, varying the pump displacement provides an infinite number of output speeds, while the fixed displacement motor provides a constant torque capability.

Operation

The hydrostatic transmission and control means therefor operate in the following manner.

Assume that the system initially is in the neutral condition shown in the drawings and that it is desired to operate motor 14 in the forward direction at some predetermined speed and so that a predetermined motor torque is maintained. Further assume that engine 12 is operating and that pumps 10 and 30 are rotating. Control lever 71a then is pivoted clockwise to cause lever 71 to be pivoted clockwise to permit spring 65 to open main control valve 50 and thereby effecting operation of stroking piston 40 to cause the port 16 of main pump 10 to provide pressurized fluid through line 26 to port 22 of motor 14. When the swashplate 120 of pump 10 is tilted, a positive stroke to the pump pistons is created. This, in turn, at any given input speed, produces a certain flow from the pump 10. This flow is transferred through high pressure fluid line 26 to the motor 14. The ratio of the volume of flow from the pump 10 to the displacement of the motor 14 will determine the speed of the motor output shaft 13. Moving the control lever 71a counterclockwise to the opposite side of neutral would reverse the flow from the pump 10 and cause the motor output shaft 13 to turn in the opposite direction. Speed of the output shaft 13 is controlled by adjusting the displacement (flow) of the transmission. Load (working pressure) is determined by the working external conditions, and this establishes the demand on the system. Motor 14 rotates in the forward direction at the desired speed and exhausted fluid is transmitted from motor port 24 through line 28 to port 18 of main pump 10 which is serving as the fluid intake port. Charge pump 30 is in operation and supplies any necessary make-up fluid from its port 32 through line 82 and through the check valve 84 therein to intake port 18 of pump 10. Because of the pressure differential between line 26 and line 28, the check valve 83 is closed. The resulting fluid pressure produced in the main fluid lines 26 and 28 between the main pump 10 and motor 14 is conditioned by the flow control valve network in the torque control circuit to produce a torque feedback signal to one side of the actuated main control valve 50, i.e., at port 62, which acts to inhibit the spool motion induced by manual operation. The resulting effect is that fluid pressure in the pump output line 26 to the motor 14 varies in proportion with motion of the control handle 71a, as modulated by the torque feedback signal. More specifically, low pressure fluid flows from port 32 of charge pump 30 through orifice 88 to point 89. The pressure of the fluid at point 89 is then modified by the pressure differential between lines 26 and 28, and line 90 (i.e., port 62 of valve 50) sees the resultant pressure and effects movement of valve spools of the main control valves 50 and 52 accordingly. Since the orifices 86 and 87 are connected in series with each other across the ports 22 and 24 of motor 14, fluid flow therethrough is proportional to the pressure drop across the motor terminals and proportionately effects the fluid pressure in line 90. As a consequence, the pilot pressure appearing at the feedback signal pilot pressure port 62 will vary. As a result the extent to which the valve spool 56 is modulated is proportional to the torque produced by motor 14. Such modulation of the control valve 50 effects corresponding modulation of the stroking piston 40, and varies the output pressure at port 16 of main pump 10 to regulate motor speed (and thus torque).

Although charge pump 30 is a constant speed pump, there are variations in charge pump output pressure that result from operation of the plurality of relief valves, such as 95, that are commonly utilized in the charge pump hydraulic circuit. Such variations are reflected in the feedback signal presented through line 90 to the control valve 50. The motion of the control valve spool of the main control valve 50 which would otherwise be induced by the feedback signal is overcome by corresponding signals (pilot pressure) acting in the opposite direction through the line 91. The balancing signal, applied to the other side of the valve spool of the actuated main control valve 50, reflects changes in charge pump pressure and functions to compensate for valve spool motion which would otherwise result from variations in charge pump output pressure reflected in the feedback signal.

Components, such as the flow control valves or orifices 88, 86, 87 and 79, are selected to obtain gain and damping characteristics suitable for proper closed-loop operation.

It is to be understood that operation of lever 71a in the reverse (counterclockwise) direction effects operation of motor 14 in reverse, and system operation is similar to that described but is reversed.

An important feature of the present invention is that the system allows for free swing when the control lever 71a is returned to neutral. That is to say, the main pump 10 does not effect an immediate braking action, but allows fluid to flow in main lines 26 and 28 for a short period of time to allow the upper section 3 of hoe 1 to continue to swing. This action is possible because the sensing means hereinbefore described senses that there is fluid back pressure on one side of the motor/pump system (i.e., in one of the lines 26 or 28) and keeps the pump swashplate 120 at some predetermined non-neutral tilted position. Thus, the motor 14 then acts like a pump, and the pump 10 acts like a motor and tends to stay on stroke. The net effect of this action is to give controlled torque deceleration for motor 13 and upper section 3 and this differs substantially from conventional systems wherein the relief valves would automatically open to dump oil (and thus waste energy) at this point in a typical machine operation.

I claim:

1. In combination in material handling machinery: a hydrostatic transmission comprising a main pump and a fluid motor connected to be driven by fluid delivered through at least one main supply line from said main pump; selectively actuatable fluid operated means operatively associated with said main pump for regulating fluid flow from said main pump to said motor to thereby control the speed of said motor; a charge pump for supplying fluid to said main pump and said fluid motor; means for driving said main pump and said charge pump; at least one main control valve which is selectively operable to direct fluid from said charge pump to said means to effect operation of said motor at a selected torque; said main control valve being modulatable in response to the pressure of a first pilot fluid supplied thereto; and first feedback signal means for supplying first pilot fluid to said main control valve at a pressure related to motor torque to modulate said main control valve when the latter is selectively operated to adjust fluid flow from said main pump to said fluid motor to maintain motor torque maximum.

2. A combination according to claim 1 wherein the pressure of said first pilot fluid is derived from the pressure differential between said one main supply line and the outlet pressure of said charge pump.

3. A combination according to claim 2 wherein said main control valve is further modulatable in response to the pressure of a second pilot fluid supplied thereto and including second feedback signal means for supplying second pilot fluid to said main control valve at a pressure related to the fluid pressure of said charge pump to further modulate said main control valve so that variations in the fluid pressure of said charge pump which are reflected in said first pilot fluid are cancelled.

4. A combination according to claim 2 wherein said first feedback signal means comprises a first pilot fluid supply line connected between said main control valve and a first circuit connected between said one main supply line and said charge pump.

5. A combination according to claim 3 wherein said second feedback signal means comprises a second pilot fluid supply line connected between said main control valve and said charge pump.

6. In combination: a hydrostatic transmission comprising a main pump and a fluid motor connected to be driven in either of two directions by fluid delivered through one of a pair of main supply lines from said main pump; selectively actuatable fluid operated means on said main pump for regulating the direction and rate of fluid flow from said main pump through said main supply lines to said motor; a charge pump for supplying fluid to said main pump and said fluid motor; means for driving said main pump and said charge pump; a pair of alternatively selectively operable pilot fluid modulatable main control valves, each of said main control valves being selectively adjustable to direct fluid from said charge pump to said means to effect operation of said motor in one direction at a selected torque, each of said main control valves being modulatable in response to the pressure of first pilot fluid supplied thereto; and first feedback signal means for supplying pilot fluid at a pressure related to motor torque to modulate whichever one of said pair of main control valves is being operated to maintain motor torque maximum.

7. A combination according to claim 6 wherein the pressure of said first pilot fluid is derived from the pressure differential between one of said pair of main supply lines and the outlet pressure of said charge pump.

8. A combination according to claim 7 wherein each of said main control valves is further modulatable in response to the pressure of a second pilot fluid supplied thereto and including second feedback signal means for supplying second pilot fluid to whichever one of said pair of main control valves is being operated at a pressure related to the fluid pressure of said charge pump to further modulate the main control valve which is being operated so that variations in the fluid pressure of said charge pump which are reflected in said first pilot fluid are cancelled.

9. In combination: a hydrostatic transmission comprising a variable displacement main pump and a fixed displacement fluid motor connected to be driven by fluid delivered through at least one main supply line from said main pump; selectively actuatable fluid operated means on said main pump for varying the displacement of said main pump and thereby regulating fluid flow from said main pump to said motor to thereby control the torque of said motor; a charge pump for supplying fluid to said main pump and said fluid motor; means for driving said main pump and said charge pump at constant speed; at least one selectively operable pilot fluid modulatable main control valve, said main control valve being selectively operable to direct fluid from said source to said means to effect operation of said motor at a selected torque, said main control valve being modulatable in response to the pressure of a first pilot fluid supplied thereto; and first feedback signal means for supplying first pilot fluid to said main control valve at a pressure related to motor torque to modulate said main control valve when the latter is selectively operated to adjust fluid flow from said main pump to said fluid motor to maintain motor torque maximum.

10. A combination according to claim 9 wherein the pressure of said first pilot fluid is derived from the pressure differential between said one main supply line and said charge pump outlet.

11. A combination according to claim 10 wherein said main control valve is further modulatable in response to the pressure of a second pilot fluid supplied thereto and including second feedback signal means for supplying second pilot fluid to said main control valve at a pressure related to the fluid pressure of said charge pump to further modulate said main control valve so that variations in the fluid pressure of said source which are reflected in said first pilot fluid are cancelled.

12. A combination according to claim 10 wherein said first feedback signal means comprises a first pilot fluid supply line connected between said main control valve and a first circuit connected between said one main supply line and said charge pump outlet.

13. A combination according to claim 11 wherein said second feedback signal means comprises a second pilot fluid supply line connected between said main control valve and said charge pump.

14. In combination: a hydrostatic transmission comprising a variable displacement main pump and a fixed displacement fluid motor connected to be driven in either of two directions by fluid delivered through one of a pair of main supply lines from said main pump; selectively actuatable fluid operated means on said main pump for regulating the direction and rate of fluid flow from said main pump through said main supply lines to said motor; a charge pump for supplying fluid to said main pump and said fluid motor; means for driving said main pump and said charge pump at constant speed; a pair of alternatively selectively operable pilot fluid modulatable main control valves, each of said main control valves being selectively adjustable to direct fluid from said charge pump to said means to effect operation of said motor in one direction at a selected torque, each of said main control valves being modulatable in response to the pressure of first pilot fluid supplied thereto; and first feedback signal means for supplying pilot fluid at a pressure related to motor torque to modulate whichever one of said pair of main control valves is being operated to maintain motor torque maximum.

15. A combination according to claim 14 wherein the pressure of said first pilot fluid is derived from the pressure differential between one of said pair of main supply lines and said charge pump.

16. A combination according to claim 15 wherein each of said main control valves is further modulatable in response to the pressure of a second pilot fluid supplied thereto and including second feedback signal means for supplying second pilot fluid to whichever one of said pair of main control valves is being operated at a pressure related to the fluid pressure of said charge pump to further modulate the main control valve which is being operated so that variations in the fluid pressure of said charge pump which are reflected in said first pilot fluid are cancelled.

17. In a hydrostatic transmission system for a high inertia load: an engine-driven swashplate-type variable displacement constant speed reversible main hydraulic pump having servo-control cylinders thereon and coupled by a pair of main fluid lines in a closed loop circuit to a swashplate-type fixed displacement variable speed reversible hydraulic motor; an engine-driven fixed displacement constant speed charge pump; a pair of control lever operated pilot pressure modulated pump displacement control valves selectively operable to direct control fluid from said charge pump to stroking pistons of said servo-control cylinders on said main pump to thereby control motor direction and torque; said charge pump also being connected through replenishing check valves to supply replenishing fluid to said closed loop circuit; a network to measure the fluid pressure drop across the motor and thus provide a pilot fluid torque feedback signal to modulate said control valves and thereby maintain maximum motor torque for the control lever position selected; said network comprising a pair of series connected flow control valves connected between said main fluid lines and a third flow control valve connected between the charge pump outlet and a point between said pair of flow control valves, and a first pilot fluid line connected between said point and said pair of control valves.

18. A system according to claim 17 further including means for transmitting a balancing signal from the charge pump to further modulate said control valves and thereby render them insensitive to variations in charge pump pressure appearing in the torque feedback signal, said means comprising a second pilot fluid line connected between the outlet of said charge pump and said pair of control valves.

* * * * *